Feb. 14, 1939.   F. W. COTTERMAN   2,146,795
OVERDRIVE GEARING
Filed Sept. 16, 1936   2 Sheets-Sheet 1

Inventor:
Frederick W. Cotterman

Fig. 4.
Fig. 3.
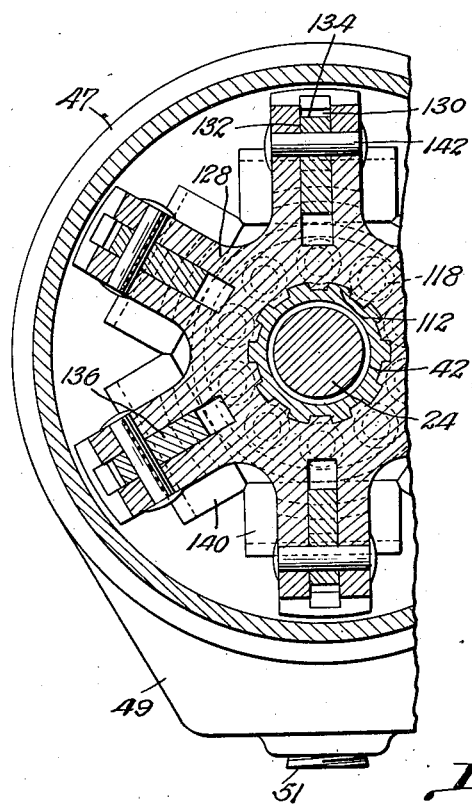
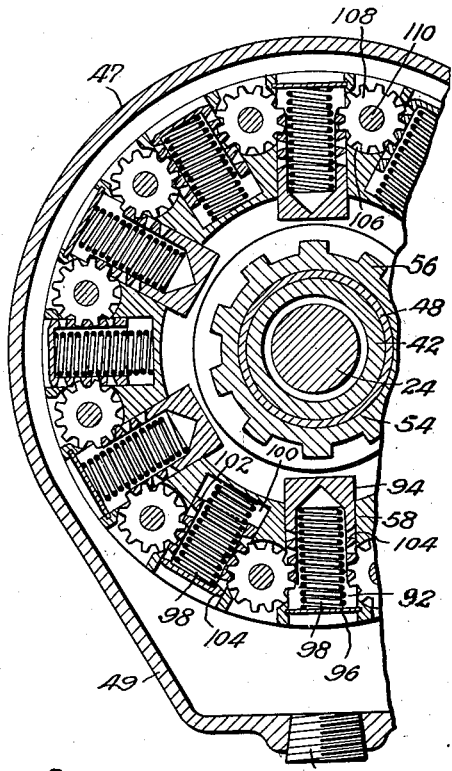
Fig. 5.
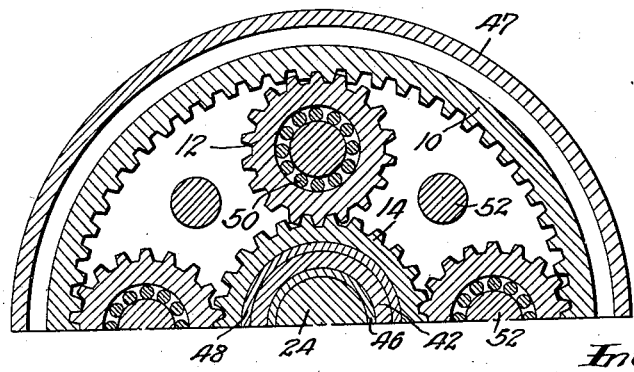
Inventor:
Frederick W. Cotterman Patented Feb. 14, 1939

2,146,795

UNITED STATES PATENT OFFICE 2,146,795

OVERDRIVE GEARING

Frederick W. Cotterman, Dayton, Ohio, assignor of one-half to Bessie D. Apple, Dayton, Ohio Application September 16, 1936, Serial No. 101,093

18 Claims. (Cl. 74—260)

This invention relates to overdrive gearing and belongs to that general class of gear mechanism now in commercial use wherein a supplementary shaft, at the rear end and in axial alignment with the main transmission shaft of a motor vehicle is drivable by speed increasing gearing whereby a given speed of the motor vehicle is attainable with less engine speed, when the load conditions are such that the maximum engine power is not required with the engine and vehicle coupled in direct drive.

Overdrive gear-sets are now commercially available to vehicle manufacturers in several types varying mainly in the mechanism provided for rendering the speed increasing gearing operative or permitting it to remain passive, as desired, some of these gear sets being brought into action manually, some by vacuum means, and some by centrifugal weight means, the latter being the most widely used.

In the commercial centrifugally operable gear-sets there is usually a positive clutch, operable into engagement by the centrifugal device any time after a predetermined speed is exceeded, to connect the drive through the speed increasing gears, but in order to cause this action to take place it is necessary that the operator momentarily release the accelerator pedal to thereby create a zero torque condition. If, then, he fails or neglects to determine when an overdrive connection is advisable and thereupon brings it into play he may do considerable driving in direct drive under load conditions for which the overdrive connection would be preferable.

It is therefore an object of this invention to provide an overdrive mechanism which will, per se, sense the then existing load condition at any speed and shift to overdrive without attention of the operator, if load conditions are such that such shift is then advisable.

Furthermore, these commercial centrifugally operative gear-sets, being speed responsive only, have a fixed vehicle speed usually 40 M. P. H., at which they will change from overdrive back to direct drive, and in using them it often happens that an operator, driving say at 70 M. P. H., has been compelled for some reason, to slow to 50 M. P. H., and then wishes to accelerate back to 70 M. P. H., in as short a time as possible. Under these conditions the operator may do one of two things, either of which is at fault, that is, he may accelerate from 50 to 70 M. P. H., in overdrive, which he must do with about 70% of the power available in direct drive, or he may purposely first decelerate to 40 M. P. H., to cause the mechanism to shift back to direct drive then accelerate from 40 to 70 M. P. H., in direct drive.

It is therefore another object of this invention to provide overdrive mechanism comprising means to measure the existing load condition both when direct drive is in effect and when overdrive is in effect and to shift from one to the other when load conditions warrant and shift irrespective of the speed of the vehicle at that time.

Still further, the centrifugally operable overdrives now available comprise a positive clutch operable into engagement by the centrifugal means upon release of the applied power to connect the overdrive gearing and speed up the overdrive shaft, but have a roller clutch for overrunningly connecting to the overdrive shaft for driving it directly when it is not being driven through the speed increasing gears. The result is that as long as direct drive is in effect this overrunning clutch acts as a free wheeling unit, the result being that drivers, who wish to have the benefit of an overdrive, must accept free wheeling whether they like it or not, and free wheeling has become very unpopular with a great many drivers.

It is therefore another object of this invention to eliminate all roller or similar overrunning clutches which not only are a source of trouble, due to the fact that they wear faster than the rest of the mechanism, but further because they provide the free wheeling condition much disapproved by drivers, and to provide instead only simple friction clutches of small dimensions which are self-adjustable for wear and which may become operative at the right time without releasing the applied power and therefore without attention of the operator.

In mechanisms of the kind herein shown, wherein a shift from one friction connecting means to another is required it is highly desirable that the connecting means which is at the moment engaged be fully engaged while the other is fully disengaged, up to the instant that a shift begins, but that, once begun, a shift must inevitably take place.

It is therefore another object of this invention to provide mechanism for shifting from one friction connecting means to the other which maintains full pressure on the one connecting means and no pressure on the other up to the instant that a shift begins, and which will be such that a shift will then be carried out regardless of any change in the load conditions or anything the operator may do, to the end that there will be no intermediate position in which the mechanism may pause and operate with both or either connecting means only partly engaged.

Other objects and advantages will become apparent as the invention is described in detail and reference is made to the drawings wherein—

Fig. 3 is a broken transverse section taken on the line 3—3 of Fig. 1 through the clutch and brake shifting mechanism.

Fig. 4 is a broken transverse section taken on the line 4—4 of Fig. 1 through the centrifugal weight mechanism.

Fig. 5 is a half transverse section taken on the line 5—5 of Fig. 2 through the gearing.

Similar numerals refer to similar parts throughout the several views.

Figure 1:
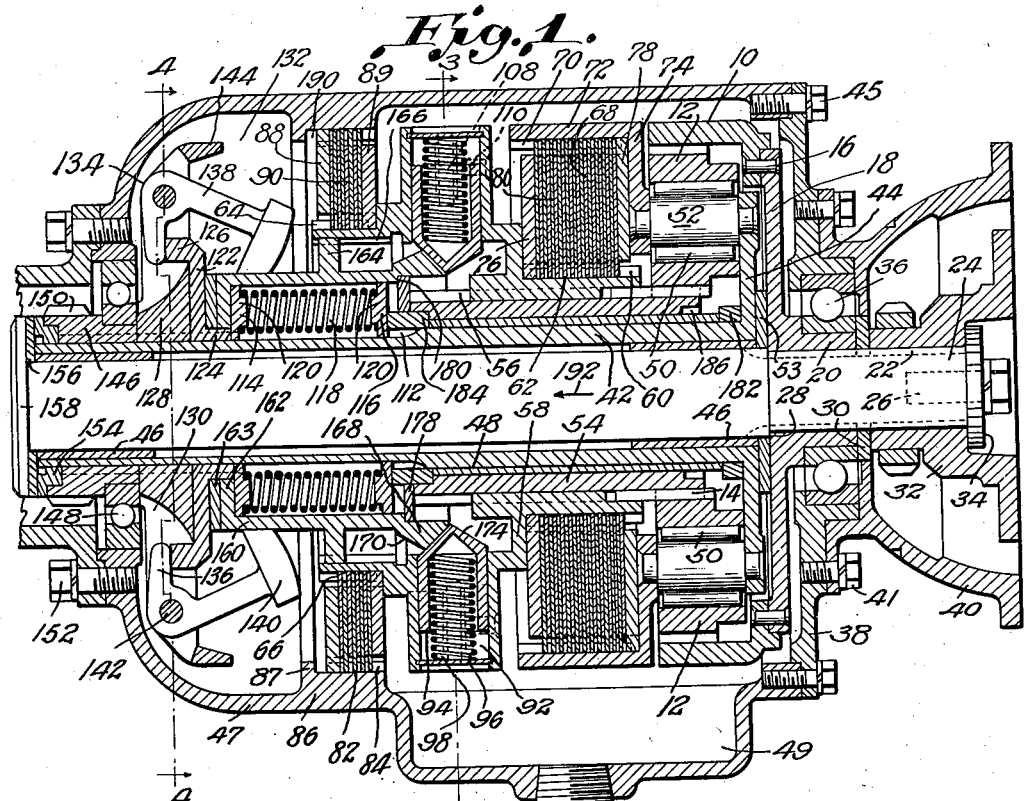
Fig. 1 is a longitudinal axial section through the overdrive mechanism in the normal or direct drive condition.

The overdrive gearing comprises the ring gear 10, the planet pinions 12 and the sun gear 14. The ring gear 10 is secured by rivets 16 to the driven member 18 which has a hub 20 internally splined to fit snugly over the external splines 22 of the driven shaft 24.

The screw 26 draws the driven member 18 against the shoulder 28 of the driven shaft 24 through the intermediate parts 30, 32 and 34 and the ball bearing 36. The ball bearing 36 is supported to take both radial and axial load between the end head 38 and the universal joint housing 40. Parts 38 and 40 are held together by the screws 41. The end head 38 is secured to the main housing 47 by the screws 45. The main housing 47 has a sump 49 on the underside to carry a supply of oil. The usual oil drain plug 51 is provided.

The planet pinion carrier comprises a long tube 42 with an integral disc 44 at the rear end. Bearing bushings 46 are press fitted in the ends of the tube 42 and runningly fitted over the shaft 24. A thrust washer 53 is interposed between the disc 44 and the driven member 18. A long bearing bushing 48 fits closely over the outside of the carrier tube 42. The sun gear 14 is runningly fitted over the bushing 48 and may move freely both rotatably and axially thereon.

The planet pinions 12 are supported on roller bearings 50 which are on four of the eight studs 52 which extend from the carrier disc 44. The pinions are in constant mesh with the ring gear 10 and the sun gear 14. A fragment of the sun gear 14 is shown in Fig. 1 in full view to show the steep helix angle of the teeth which causes the sun gear to have a very heavy forward end thrust under load. This end thrust plays a very important part in the operation of the device inasmuch as it influences clutch shifting both when gear drive is in effect and when direct drive is in effect.

Sun gear 14 has a long integral hub 54 extending forwardly. Hub 54 has external splines 56. A clutch and brake member 58 is internally splined to fit slidably over the splines 56.

At the rear end the clutch and brake member 58 has external teeth 60 over which the internally toothed clutch plates 62 are axially slidable. At the forward end the clutch and brake member 58 has the external teeth 64 over which the internally toothed brake plates 66 are axially slidable.

Extending between the clutch plates 62 are a series of clutch plates 68, the external teeth of which fit slidably into the internal teeth 70 of the direct drive clutch ring 72. The ring 72 has an inwardly extending flange 74 at the rearward edge. Flange 74 is secured to the outer ends of the eight studs 52. The two outer plates 76 and 78 are thicker than the others. The plates 62, 68, 76, 78, and the ring 72 comprise the direct drive clutch which may be broadly designated by the numeral 80.

Extending between the brake plates 66 are a series of brake plates 82, the external teeth of which fit slidably into the internal teeth 84 of the overdrive brake ring 86. Brake ring 86 is part of the housing 47 and is therefore non-rotatable. The two outer plates 88 and 89 are thicker than the others, a short flange 87 extends inwardly and forms a shoulder against which the plates may be compressed when the brake is to be engaged. The plates 66, 82, 88, 89 and ring 86 comprise the overdrive brake which may be broadly designated by the numeral 90.

Intermediate the clutch 80 and brake 90, in the combined clutch member 58, are a plurality of radial openings 92, into which the clutch and brake pressure plungers 94 are slidably fitted. The outer ends of the openings 92 are closed by the plates 96 which are sprung into grooves in the inside of the openings near the ends. The plungers 94 are hollow cylinders with the inner ends closed. Clutch and brake pressure springs 98 urge the plungers 94 inwardly.

Circumferentially intermediate the radial openings 92 are a series of similar openings 100 into which the counterweights 102 are slidably fitted. (See Fig. 3.)

The openings 100 do not extend all the way through, whereby the inner ends are closed. The counterweights 102 are hollow cylinders with the outer ends closed. Additional clutch and brake pressure springs 98 urge the counterweights 102 outwardly.

Opposite edges both of the plungers 94 and the counterweights 102 are cut across to provide the rack teeth 104. A series of axially parallel openings 106, Fig. 3, let in the small pinions 108 to an extent which brings the center of the pinion thickness on the plane of rotation of the plungers and counterweights, that is, on the line 3—3 of Fig. 1. Studs 110 are provided to rotatably support the pinions. Through this arrangement an outward movement of the plungers 94 produces an inward movement of the counterweights 102 through the rack and pinion connection. Each plunger 94 is therefore pressed inward by the force of two clutch and brake pressure springs 98.

The counterweights 102 are provided because a spring force which would be adequate to hold the plungers 94 pressed inward with a suitable engaging pressure at 50 M. P. H., would be more than neutralized by the centrifugal force of the plunger at 70 M. P. H. This is true even when the plungers 94 are made as light as mechanically practicable.

From the middle to the forward end, the carrier tube 42 has external splines 112. Two spring holding washers 114 and 116 have slidably fitted internal splines extending into the splines 112. A series of brake-to-clutch shifting springs 118 are held in place by the washers and urge the washers apart. Washers 114 and 116 carry circumferentially spaced apart bosses 120 to hold the springs in place.

A clutch and brake shifting plate 122 has a short rearwardly extending hub 124 which is internally splined to fit slidably over the external splines 112 of the carrier tube 42. Lugs 126 extend forwardly at the periphery of the plate for the work arm of the clutch-to-brake shifting centrifugal weight to act against.

The weight carrying spider 128 is internally splined to fit over the external splines 112. Each leg of the spider is slotted at 130 (see Fig. 4) to receive a centrifugal weight 132. A weight 132 comprises a hub 134, a work arm 136, a power arm 138 and a weight mass 140 at the end of the power arm. A hinge pin 142 extends through each leg and through the hub 134 of a weight. The slots 130 do not extend all the way out through the periphery of the spider thereby leaving stops 144 against which the power arms 138 may rest when the weights are in their outer position.

A driving member 146 is internally splined to fit in the external splines 112. The outer race of the ball bearing 148 fits slidably in the housing 47 and has space therein to float axially while the inner race is lightly press fitted over the outside of member 146 at the rear end. Short external splines 150 are provided at the periphery at the forward end which may be engaged by a suitable internally splined member extending from the rear of the conventional transmission gear box with which this overdrive gear-set is intended to be used and to which it may be held by the screws 152.

Near the forward end of the carrier tube 42 a circular groove is cut around it to the depth of the external splines 112. A retaining ring 154 is made in halves and inserted in this groove. The ring may be gotten into place by pressing rearward on the driving member 146 until the springs 118 yield and allow the driving member to move rearwardly the width of the ring. After the two halves of the ring are inserted in the groove, the springs 118 are allowed to force the driving member 146 over the outside of the divided ring and hold its halves together. A thrust washer 156 is runningly fitted between the ring 154 and the head 158 of the driven shaft 24.

The clutch and brake shifting cylinder 160 has an inwardly extending flange 162 at the forward end. A thrust washer 163 is interposed between flange 162 and the rear face of the shifting plate 122. The hub 124 is very slightly longer than the combined thickness of the flange 162 and washer 163 whereby the flange and washer are not pinched together by the pressure of the springs 118 but are both runningly fitted between the plate 122 and washer 114.

A circular ring 164 extends outwardly from the cylinder near the middle and forms a support for the forward end of the combined clutch and brake member 58. Internal splines 166 in the member 58 are slidable over corresponding external splines on the ring 164. The rearward end of cylinder 160 is enlarged at 168 and this enlarged part has beveled surfaces 170 and 172 which correspond to the beveled faces 174 and 176 respectively of the clutch and brake pressure plunger 94. The bore of the cylinder 160 near the rearward end is enlarged for a short distance to allow the washer 178 to enter and rest against the shoulder 180. The end of the hub 54 of the sun gear 14 usually bears against the washer 178 but may under certain conditions be drawn away therefrom.

A collar 182 is interposed between the rearward end of the bearing bushing 48 and the carrier disc 44, and a second collar 184 is interposed between the forward end of the bushing 48 and the spring holding washer 116, the two collars and the bushing thereby forming a stop to hold the washer 116 from being forced rearward by the springs 118.

The sun gear 14 is counterbored at the rearward end at 186 to fit rather closely over the collar 182. The sun gear hub 54 is counterbored at the forward end at 188 to fit rather closely over the collar 184. The sun gear is movable axially between the collars 182 and 184 and due to the trapping of oil in the counterbores 186 and 188 a too rapid shift of the sun gear from one position to the other is prevented. The fit of the counterbores over the collars 182 and 184 may be altered to vary the speed at which the sun gear may be moving at the ends of its axial travel.

It will be seen that the driving member 146, the weight spider 128, weights 132, carrier tube 42 and disc 44, planet pinions 12 and clutch ring 72 must always rotate in unison and at the speed of the regular transmission shaft to which they are coupled. Also that the sun gear 14, combined clutch and member 58 and clutch and brake shifting cylinder 160 must always rotate together if they rotate at all.

The overdrive gear-set herein shown is intended to be used in connection with a standard three speed forward and reverse automotive transmission. When attached to the rear end of such a transmission of suitable design and employed in connection with a rear axle of the ratio for which this device was intended, the operation will be as follows:

*Operation*

During the time that the operator is accelerating the vehicle or otherwise using the first and second gear speeds of the regular transmission, the overdrive gear-set remains as in Fig. 1, that is, the clutch and brake pressure plungers 94, being urged inward by the springs 98 with the beveled faces 176 of the plungers bearing on the beveled faces 172 of the clutch and brake shifting cylinder, cause the clutch 80 to be engaged, whereby the sun gear 14 is connected for rotation in unison with the carrier flange 44. The combined clutch and brake member 58, being now in its rearward position, there is created a gap 190 for the discs of the brake 90 to spread into whereby the brake 90 is completely disengaged.

Inasmuch as the carrier is at all times the driver, both in direct drive and in overdrive, the load on the studs 52 is at all times divided equally by the planet pinions 12 so that the pitch line pressure on the ring gear teeth and that on the sun gear teeth are exactly equal, but since the sun gear cannot now rotate, the planet pinions are thereby prevented from rotating, with the result that the ring gear 10 is driven in unison with the carrier.

But while the engagement of the clutch 80 prevents rotation of the run gear 14 it does not prevent its axial movement when it has space into which it may move. Due to the steep helical angle of the gear teeth, slightly greater than 45 degrees, the sun gear is urged axially in the direction of the arrow 192 with a force slightly greater than its pitch line pressure, but as long as the carrier is being driven forwardly, that is, clockwise, when standing at the left of Fig. 1, the sun gear merely presses the weights 132 more tightly to the "in" position shown.

If now, the operator employs the reverse gear of the regular transmission, the carrier 44 will be rotated counterclockwise, with the result that the sun gear 14 will be drawn axially opposite to the arrow 192, but this will not affect the clutch 80 in any manner because the sun gear may move axially freely except insofar as it is slowed up in its movement by the dash pot action of the collars 182 and 184 in the counterbores 186 and 188.

By considering Fig. 1 it will be seen that the weights 132 are held to their "in" position by the combined forces of the springs 118, the springs 98 and the axial thrust of the sun gear 14. In the structure shown, these parts are so proportioned that the centrifugal force of the weights at 48 M. P. H., exactly balances the combined force of the shifting springs 118 and the clutch pressure springs 98, and at 68 M. P. H., the centrifugal force of the weights exactly balances the force of the springs 118 and 98 plus the axial thrust of the sun gear 14, when maximum engine torque is being applied thereto.

When then, the mechanism is in the state shown in Fig. 1, and a speed ever so slightly over 48 M. P. H., is reached, the operator may interrupt the feeding of fuel so as to bring the axial thrust of the sun gear to zero value, and a shift up will occur, that is, the mechanism will change from the condition shown in Fig. 1 to the condition shown in Fig. 2, where the weights 132 have moved to the "out" position, the springs 118 are in their most compressed state and the springs 98 have been compressed but are again expanded because of the fact that the beveled faces 174 of the plungers are now resting on the beveled faces 170 of the clutch shifting cylinder whereby the brake 90 is engaged and a space 193 is created for the plates of the clutch 80 to spread into whereby clutch 80 will be fully disengaged.

When the mechanism is new and before the clutch plates are worn, the combined clutch and brake member 58 has only 1/8" axial movement, but during the life of the mechanism some wear of the plates will occur.

As the plates wear the axial movement of the combined clutch and brake member 58 merely increases automatically by virtue of the fact that the beveled faces 174 and 176 of the plungers merely slide down the inclines 170 and 172 farther. The friction clutch 80 and brake 90 are therefore automatically adjustable, and provision is made for more wear than may occur during the life of the device.

With the brake 90 engaged, the sun gear 14 is held against rotation and the ring gear 10 is driven at a speed faster than the carrier. The gearing is such that seven revolutions of the carrier now produce ten revolutions of the ring gear and driven shaft 24.

Now since this increase in wheel speed is had at a sacrifice of wheel torque it follows that the shift up to overdrive should preferably not occur at 48 M. P. H., if any considerable torque is then needed. Since the centrifugal force of the weight 132 does not reach a value sufficient to balance the force of the springs 118, plus the springs 98, plus the maximum possible thrust of the sun gear 14 until a speed of 68 M. P. H., is passed, it follows that, if full torque is being transmitted, that is, if the operator is urging the engine to its full capacity, as on a considerable grade, or upon rapid acceleration, the shift up will not occur until a speed of 68 M. P. H., is exceeded.

If substantially half of the engine power is being applied the weights 132 in order to cause a shift-up would have to balance the springs 118, plus the springs 98, plus half of the possible maximum sun gear thrust. Thus with half the engine power applied, the shift to overdrive would take place at about 58 M. P. H. Above 68 M. P. H., it will be understood a shift up cannot be prevented even when full power is being applied.

The speed of 68 M. P. H., was selected because at that speed the peak horsepower of the engine, for which the mechanism was proportioned was passed.

Figure 2:
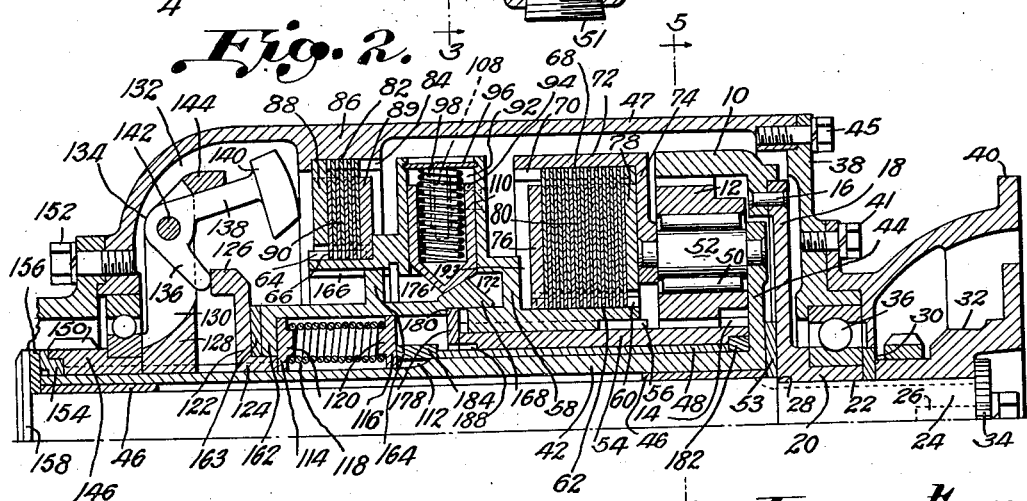
Fig. 2 is a longitudinal axial half section through the mechanism when it is shifted for overdrive.

Referring both to Figs. 1 and 2, it will be seen that while in Fig. 1 the weights 132 are kept in the "in" position by the force of the springs 118, plus the springs 98, plus the axial thrust of the sun gear, in Fig. 2, the weights are urged back to the "in" position by the force of the springs 118, minus the force of the springs 98, plus the axial thrust of the sun gear.

Inasmuch as the springs 118 and 98 Fig. 1, are under such stress that they alone hold the weights 132 to the "in" position up to 48 M. P. H., they must have considerable force. The springs 98 must first be under sufficient stress to keep the clutch or brake engaged. Increase in the number of plates, of course, lessens the amount of stress necessary in the springs 98. With clutch and brake of the dimensions shown the springs 98 when stressed as in Fig. 1 should together exert a force of about four hundred pounds. In order that a shift down from the condition Fig. 2 to Fig. 1 may occur at a suitable speed under no load condition, the springs 118, when compressed as in Fig. 2, must exert a considerably greater force than the springs 98, because under no load conditions the springs 118 Fig. 2 alone must overcome the force of the weights 132, plus the force of the springs 98 in order to shift back down.

Now, when springs 118 are made heavy enough to provide the force necessary when stressed as in Fig. 1, their force increases considerably when further stressed to the condition Fig. 2.

So, in order to insure that the weights, when they once start out, will continue to move out under a rapidly increasing spring resistance, the weights must progressively increase their own force as they move out at a rate slightly greater than the spring increase. To do this certain features in the design of the weights must be observed.

Referring to Fig. 4 it will be seen that the larger mass 140 of a weight 132 is at the outer end of a long arm 138. In this way the center of gravity of an entire weight is kept as far as possible from the hinge pin 142. With the center of gravity as far as possible from the hinge pin, the center of gravity moves through a greater distance in moving from the "in" to the "out" position and the ratio between the distance from the axis when "in" and the distance when "out" is greater. Thus if the center of gravity of a weight could double its distance from the axis of rotation by moving out, it would double its force by virtue alone of its moving out without having altered its speed of rotation.

The weights 132 are so proportioned that, partly due to the positioning of the center of gravity as above mentioned and partly due to the improvement in the effectiveness in the power arm and work arm in the "out" over the "in" position, the weight force, as the weights move out progressively increases at a rate slightly faster than the increase in spring resistance, whereby the weights, when they once start out will never be stopped until they have moved all the way out.

Now inasmuch as the weights 132 in Fig. 1 are held "in" by the force of the springs 118, plus the springs 98, and in Fig. 2 are urged in by the force of springs 118 minus springs 98, there is such a drop in the total force which urges the weights inward that it would normally be supposed that the mechanism would have to be brought to near rest before a shift down would occur. However, by placing the weights 132 on the driving member instead of on the driven member as is usual in speed-torque controlled devices, an unexpected result is achieved as follows:

The weights start out by overcoming the springs 118, plus the springs 98. In a fraction of a second they reach the "out" position where the weight force has further increased. The spring force is now decreased to that of the springs 118, minus the springs 98, leaving a much too wide margin of weight force over spring force. But in another fraction of a second the brake 90 engages and connects the driving shaft to the driven shaft through the 7 to 10 gearing so that while the vehicle moves on at the same speed, the weights drop to $\frac{7}{10}$ of the speed they were revolving before they started "out". The weight force is thereby decreased to $$\frac{7^2}{10^2} \text{ equals } 49/100$$

or less than half the value it had before the engagement of brake 90 reduced its speed.

If, while the device is in the condition Fig. 1, the maximum torque is applied until the vehicle speed rises to 68 M. P. H., the force of the springs 118, plus the springs 98, plus the sun gear thrust will be equaled by the force of the weights, and at a slight further increase the shift up will occur, but in this case no shift down may be made until the vehicle speed drops to 60 M. P. H., and then only if maximum torque is being applied.

With the weights, springs and sun gear end thrust in the proportion indicated, a shift up may be had as low as 48 M. P. H., by applying zero torque. A shift up may be had at 58 M. P. H., by allowing the torque being applied to drop to half its maximum value. A shift up will be had at 68 M. P. H., even though the maximum torque is being applied.

A shift down will be had at 40 M. P. H., if zero torque is being applied. A shift down will occur at 50 M. P. H., if about half the maximum torque is applied. A shift down may be had as high as 60 M. P. H., by applying the full engine torque.

Thus it will be seen that having shifted up at a given speed the conditions which will cause a shift back down are either, (1) a grade which will pull the vehicle speed down about 8 M. P. H., with the same applied torque which was in effect at the shift up, or (2) the substantial doubling of the applied torque at the same speed as was had at the time of the shift up, or (3) any combination of speed and load conditions such as somewhat more torque plus somewhat less speed due to load, which will permit the weight force to be overcome.

*Proportion*

Since a large percentage of automotive vehicles at present use around 85 H. P. engines, the device herein shown was proportioned for 85 H. P. with a 4½ to 1 rear axle and 28" wheels. By taking the outside diameter of the housing 47 as 7⅝" and making all scalable dimensions in the same proportion, the device will be suitable for such an engine. Inasmuch as the redesign of the device for other powers and speed ratios may not be clear from the specification hereinbefore given, the procedure followed in proportioning the present device may preferably be outlined.

An overdrive ratio of 7 to 10 as between the driver and driven being considered good practice, gearing giving as nearly as possible this ratio is first determined. By using a ring gear of 62 teeth, a sun gear of 26 teeth and planet pinions having 18 teeth the ratio will be $$\frac{62}{62+26} \text{ equals } \frac{.7047}{1.0000}$$

or very nearly the 7 to 10 desired.

The helix angle must then be tentatively determined in order to get the gear pitch diameters, but it must be remembered that unless a high helix angle is selected, it will later be found that the clutch and brake become of abnormal size. In the present instance after a great number of trial calculations a helix angle of 50 degrees was adopted. Using 16 normal diametral pitch the pitch diameter may be found to be 6.028", 2.528" and 1.750" for the ring, sun and planets respectively.

With a 50 degree helix angle and an engine which provides a torque of about 160 foot pounds maximum, the axial thrust of the sun gear which ultimately determines the clutch and brake dimensions may next be found.

With 160 foot pounds, the load on the carrier 44 at the center of a planet pinion which, from the pitch diameters of the gears, may be found to be 2.139", will be 160×12/2.139 equals 900 pounds.

When the clutch 80 is engaged thereby locking the carrier and sun gear so that they must rotate in unison, the pitch line load on the ring gear will be, $$\frac{\text{Pitch radius of center of planet pinion}}{\text{Pitch radius of ring gear}} \times$$

900 equals 2.139/3.014×900 equals 639 pounds.

The pressure at the pitch line of the ring gear being 639 pounds, the pressure at the pitch line of the sun gear must be the same, that is, 639 pounds. The axial sun gear thrust is therefore Tan. 50 degrees × 639 equals 762 pounds. This is the axial thrust of the sun gear when the clutch 80 is engaged for direct drive and the maximum torque input of 160 foot pounds is applied. When, however, the brake 90 is engaged for overdrive a different thrust value is had.

With brake 90 engaged the sun gear is held against rotation by the housing. The carrier load of 900 pounds at the center of a planet pinion is therefore equally divided between the ring and sun gear, producing a pitch line pressure of 450 pounds on each. Thus 450 pounds pitch line load on the sun gear therefore produces an axial thrust of Tan. 50 degrees × 450 equals 536 pounds. The maximum axial sun gear thrust is therefore 762 pounds in direct drive and 536 pounds in overdrive.

Having determined from the maximum torque curve of the engine that the minimum speed at which overdrive may be brought in should be 48 M. P. H., and the maximum speed at which overdrive may be held out should be 68 M. P. H., and knowing the maximum sun gear thrust in direct drive to be 762 pounds, it will be seen that the weights 132 must balance the springs 118, plus the springs 98 at 48 M. P. H., but must balance the springs 118, plus the springs 98, plus 762 pounds at 68 M. P. H. Since the force of the weights is in proportion to the square of the speed, and $48^2/68^2$ is substantially ½, the sum of the springs 118 and 98 must be half the sum of the springs plus the sun gear thrust. It follows that the force of the springs 118, plus the springs 98 will be 762 pounds, the same as the axial sun gear thrust.

It should be remembered that when the torque curve of the engine for which the overdrive is being designed indicates different speeds than 48 M. P. H., and 68 M. P. H., then the ratio of the springs to the sun gear thrust will correspond to such different speeds.

Having determined that the springs 118 and 98 should together provide a force of 762 pounds when in the condition shown in Fig. 1 and that the springs 118 may probably double their force when they are compressed to the overdrive state Fig. 2, and that when so doubled they may be called upon to overcome the force of the weights 132, plus the springs 98 in order to shift back down when zero torque is in effect, the force of springs 98 may tentatively be fixed by trial. After a number of trial calculations in the instant case the force of springs 98 in Fig. 1 was fixed at 400 pounds.

The engagement of the clutch 80 depends wholly on this force. Its dimensions must therefore be fixed accordingly. The pitch line pressure on the sun gear at 160 foot pounds input in direct drive was hereinbefore found to be 639 pounds, and if the clutch 80 had only to carry this load it would be relatively small. But when the regular transmission is in reverse the reverse ratio may be as much as 3.38 to 1 which raises the pressure at the pitch line of the sun gear to 3.38×639 equals 2160 pounds. This is a static load and there are four sun gear teeth to take it, but the clutch 80 must be made accordingly. This accounts for the large size of the direct drive clutch which according to standard practice will carry this load. The number and size of the plates may be gotten from the drawings.

Having before determined that the springs 118 and 98 together should have a force of 762 pounds and, having fixed the springs 98 at 400 pounds, leaves 362 pounds force for the springs 118 when in the condition shown in Fig. 1.

Now, as before stated, the 362 pound spring force Fig. 1 must be greatly increased by the change to the condition Fig. 2, but this increase is limited by the fact that weights 132 must be designed to increase their force slightly faster than the force of the springs 118 increases, in order to insure that the weights will fly out once they start out. After a number of trial calculations the force of the springs 118 in Fig. 2 was fixed at 673 pounds. There are 10 springs 118, so each must have a force of 36.2 pounds in the condition Fig. 1 and 67.3 pounds in the condition shown in Fig. 2.

A spring of .080 round wire coiled $\frac{7}{16}$" pitch diameter having 10¼ active coils, 2 inactive, a free length of 2.332" will provide the forces required when compressed as in Figs. 1 and 2.

The springs 98 also increase their force as they are compressed during the transition from direct to overdrive and vice versa. Since 12 springs provide a force of 400 pounds, each spring must provide 33⅓ pounds. A spring 98 made of .072" round wire coiled ½" pitch diameter having 12 coils and a free length of 2.666" will provide 33.3 pounds when in the state shown in Fig. 1 and 40.7 pounds at its most compressed state during the transition from direct to overdrive. The 12 springs therefore change their force from 400 to 488 pounds when they are being compressed by the weights 132.

But the 88 pound increase is substantially neutralized by the fact that, in Fig. 1, the counterweights 102 have their centers of gravity ⅝" farther out from the axis of rotation than the plungers 94 and the counterweights therefore, although lighter, balance the plungers, but in the most compressed state of the springs 98, that is at the point of trip-over from one drive to the other, the condition is reversed, and the heavier plungers are ⅝" farther out than the lighter counterweights.

With the plungers and counterweights proportioned as shown, while the 400 pound spring force increases to 488 in the most compressed state this 488 pounds is weakened by 59 pounds excess centrifugal force of plungers over counterweights when a shift occurs at 48 M. P. H., and 118 pounds when the shift occurs at 68 M. P. H., because, at the shift over point, the counterweights are farther from the axis of rotation.

This fact is important in that it affects the design of the weights 132 which must increase their force as they move out from the axis slightly faster than the rate of increase of the combined force of the springs 118 and 98.

The weights 132 may be made by scaling the dimensions and the angle through which they operate from the "in" to the "out" position. When so made the six weights will together weigh 1.596 pounds. The center of gravity of a weight will be 1.125" from the center of a hinge pin. The center of gravity will be 2.125" from the axis of rotation in Fig. 1 and 2.893" in Fig. 2. Calculations of intermediate positions will show that the weights will increase their force as they move out slightly faster than the spring resistance increases. Their proportion must be found somewhat by trial but it may be remembered that the farther the center of gravity of a weight is from the hinge pin, and the greater angle through which the weight swings, the more rapid the increase in force of the weight as it moves out. The angular position of the power and work arms of the weights at the start and finish of their travel also influence the rate of increase of axial force exerted by the weights. The center of gravity of the weights in Fig. 1 is on a line which is at an angle of 23 degrees and 40 minutes below the axis of rotation, and, in Fig. 2, is 16 degrees and 20 minutes beyond the axis of rotation. The center of the rounded end of the work arm in Fig. 1 is 10 degrees from the vertical line, and, in Fig. 2, is 30 degrees beyond the vertical line.

The weights, if in the condition Fig. 1 at 48 M. P. H., will have a force of 762 pounds which is the combined force of springs 118 and 98.

As the weights move and reach the point of tripover at which the springs 98 are most compressed, the weights will exert an axial force of 1025 pounds. Clear out as in Fig. 2 they will exert an axial force of 1240 pounds for an instant, but thereafter the brake 90 engages and the speed of the weights drop to $\frac{7}{10}$ of their former value reducing the weight force to $7^2/10^2$ or $49/100 \times 1240$ equals 616 pounds.

The brake 90 is so much smaller than the clutch 80 because it is never operative when low gear or reverse is being used in the regular transmission.

The angle of the beveled faces 174 of the plungers 94 which urges the brake 90 into engagement, is also less than the angle of the beveled faces 176 which urges the clutch 80 into engagement. This assists in keeping down the helix angle of the gear teeth which must provide the axial thrust in bringing about a shift down from overdrive to direct drive.

By calculating the centrifugal force of the weights 132 in Fig. 1 and the axial force exerted therefrom by the work arm 136 at 48 M. P. H., this weight force will be found to balance the springs 118 and 98 together.

At 58 M. P. H., the weights will be found to balance the springs 118 and 98 plus about half the maximum sun gear thrust. At 68 M. P. H., the weights will be found to balance the springs 118 and 98 plus the maximum sun gear thrust.

When, at 48 M. P. H., zero torque has been created and the weights allowed to move out to overdrive as in Fig. 2 thus causing their speed to drop to 7/10 of what it was before the shift, the weight force may be calculated, giving attention to the fact that the weights are farther out from the axis and are operating through a more effective leverage but are rotating only 7/10 as fast and it will be found that the weight force so far exceeds the force of springs 118 and 98 that it will take about 36% of the sun gear thrust added to the spring force to bring about a shift down from overdrive to direct drive. That is, if the operator has shifted to overdrive at 48 M. P. H., and thereupon encounters a hill or the necessity for rapid acceleration which is in excess of 36% of the engine power the mechanism, instead of struggling with the load through the overdrive gearing which is adapted for more speed with less power, the mechanism will shift down from overdrive until the load is lighter.

If, however, the speed is as much as 58 M. P. H., in overdrive, a calculation of the weight force as balanced against the springs 118, plus the springs 98, plus the sun gear thrust will reveal that at 58 M. P. H., in overdrive the operator may apply as much as 89% of the maximum torque without shifting back down.

Above 60 M. P. H., the application of the full torque will not shift back down.

Having described an embodiment of my invention in which the objects set forth are attained, I claim:

1. Power transmission mechanism comprising, a driving member, a driven member, speed increasing gearing for connecting said members, a gear drive control means engageable to cause the driving member to revolve the driven member at increased speed through said gearing, a direct drive connecting means for connecting said members to revolve in unison, means responsive to the speed of one of said members constantly urging the direct drive connecting means to disconnected position and the gear drive control means to engaged position, and torque responsive means opposing said speed responsive means in proportion to the torque being transmitted.

2. Power transmission mechanism comprising, a driving member, a driven member, a speed increasing gear train for connecting said members, a control means operable for revolving the driven member by the driving member at increased speed through said gear train for gear drive, a connecting means for connecting said members to revolve in unison for direct drive, one of the gears of said train being so placed that it takes the reaction of the torque load both when in direct drive and in gear drive, means responsive to the speed of one of said members constantly urging disconnection of the direct drive connecting means and operation of the gear drive control means, and means operated by the said reaction of said one gear, operative by and in proportion to the torque load on said one gear, to affect said connecting means and control means oppositely of said speed responsive means both when direct drive is in effect and when gear drive is in effect.

3. Power transmission mechanism comprising, a driving member, a driven member, a speed increasing helical gear train for connecting said members, a gear drive control means operable for revolving one of said members by the other at different speeds through said gear train, a direct drive connecting means for connecting said members to revolve in unison, one of said gears being movable axially by its torque reaction both when gear drive is in effect and when direct drive is in effect, means responsive to the speed of one of said members, an operating member operative in one direction by said speed responsive means to disconnect the direct drive connecting means and operate the gear drive control means, and in the other direction by the said axially movable gear to release the gear drive control means and connect the direct drive connecting means.

4. Power transmission gearing comprising, a driving member, a driven member, a gear train for connecting said members, a gear drive control means engageable for rotating one of said members by the other through said gear train at different speeds, a direct drive connecting means for connecting said members to revolve in unison, one of the gears being placed to receive the torque reaction both when direct drive is in effect and when gear drive is in effect, a speed responsive means rotatable by one of said members, a movable operating member urged in one direction by said speed responsive means upon increase in speed and in the other direction by the torque reaction on said gear upon increase in torque, resilient means for applying pressure to hold said connecting means connected and said control means released, and means operative during the movement of said operating member to remove the said pressure from the connecting means and apply it to the control means to hold said control means engaged and said connecting means disconnected.

5. Power transmission mechanism comprising, a driving member, a driven member, a gear train for connecting said members, a gear drive control means applicable for revolving one of said members by the other at different speeds through said gear train, a direct drive connecting means for connecting said members to revolve in unison, a connecting means and control means operating member constantly urged in one direction, in proportion to the torque being transmitted, by reaction of one of the gears, said reaction being effective both in gear drive and in direct drive, a speed responsive means rotatable by one of said members, operative to urge said operating member in the other direction in proportion to the speed, resilient means for applying pressure to either connect said connecting means or apply said control means, and means operative at one point in the movement when the operating member is moved by the speed responsive means to remove the said pressure from the direct drive connecting means and apply it to the gear drive control means, and operative at another point in the movement when the operating member is moved by the torque reaction to remove the said pressure from the gear drive control means and apply it to the direct drive connecting means.

6. Power transmission mechanism comprising, a driving member, a driven member, a gear train for connecting said members, a gear drive control means engageable for rotating said members one by the other at different speeds through said gear train, a direct drive connecting means engageable for connecting said members to revolve in unison, a connecting means and control means operating member constantly urged in one direction in proportion to the torque by reaction of one of said gears, said reaction being effective both in gear drive and in direct drive, a speed responsive means, rotatable by one of said members, constantly urging the operating member in the other direction in proportion to the speed, a pressure means transferable from one to the other between the connecting means and the control means to maintain engagement, and means on said operating member operative at a point in its movement in one direction to transfer said pressure means from the direct drive connecting means to the gear drive control means, and at a point in its movement in the other direction to transfer said pressure means from the gear drive control means to the direct drive connecting means.

7. Power transmission mechanism comprising, a driving member, a driven member, a gear train for connecting said members, a gear drive control means engageable for causing one of said members to revolve the other through said gear train at different speeds, a direct drive connecting means engageable for connecting said members to revolve in unison, a connecting means and control means operating member constantly urged in one direction, with a force which is in proportion to the torque, by reaction of one of the gears, a speed responsive means, rotated by one of said members, constantly urging the operating member in the other direction with a force which is in proportion to the speed, means providing engaging pressure transferable from one to the other between the connecting and the controlling means, and means on said operating member adapted when moved by said speed responsive means to transfer said pressure from the direct drive connecting means to the gear drive control means, and adapted when moved by said gear reaction to transfer said pressure from the gear drive control means to the direct drive connecting means.

8. Power transmission mechanism comprising, a driving member, a driven member, a gear train for connecting said members, a gear drive control means engageable for revolving said members one by the other through said gear train at different speeds, a direct drive connecting means engageable for connecting said members to revolve in unison, a connecting means and control means operating member always urged in one direction by the torque reaction of one of the gears, a speed responsive means rotated by the driving member always urging said operating member in the other direction, a resilient means urging the operating member in the same direction as it is urged by the said torque reaction, a means providing pressure transferable from one to the other between the connecting means and the control means to maintain engagement, and means on said operating member, operative when moved by said speed responsive means against the resistance of said resilient means alone to transfer said pressure from the direct drive connecting means to the gear drive control means at a relatively low speed, but operative when moved by said speed responsive means against the resistance of both the resilient means and the torque reaction, to transfer said pressure from the direct drive connecting means to the gear drive control means at speeds which are proportionately higher as the said torque reaction is greater.

9. Power transmission mechanism comprising, a driving member, a driven member, a gear train for connecting said members, a gear drive control means engageable for causing one of said members to increase the speed of the other by driving it through said gear train, a direct drive connecting means for connecting said members to revolve in unison, a connecting means and control means operating member always urged in one direction by the torque reaction of one of the gears, a speed responsive means on the driving member always urging said operating member in the other direction, a resilient means urging the operating member in the same direction as it is being urged by the said torque reaction, a means providing pressure transferable from one to the other between the connecting means and control means to maintain engagement, and means on said operating member, operative when moved by said resilient means alone against the resistance of said speed responsive means to transfer said pressure from said gear drive control means to said direct drive connecting means at a relatively low speed, but operative when moved by both the said resilient means and the said torque reaction against the resistance of said speed responsive means to transfer said pressure from the gear drive control means to the direct drive connecting means at speeds which are higher in proportion as the said torque reaction is greater.

10. Power transmission mechanism comprising, a driving member, a driven member, a gear train for connecting said members, a gear drive control means applicable for rotating said members, one by the other, at different speeds through said gear train, a direct drive connecting means for connecting said members to revolve in unison, a connecting means and control means operating member always urged in one direction by the torque reaction of one of the gears, a speed responsive means rotated by the driving member always urging said operating member in the other direction, a resilient means urging the operating member in the same direction as it is being urged by the said torque reaction, an expansible means normally reacting in one direction to keep the direct drive connecting means connected and in the other direction to assist the said resilient means and torque reaction to keep said speed responsive means from acting but transferable by action of said speed responsive means to react in the said other direction to keep the gear drive control means applied and in the first said direction to oppose the said resilient means and torque reaction.

11. Power transmission mechanism comprising, a driving member, a driven member, a gear train for connecting said members, a gear drive control means applicable for revolving one of said members by the other at a different speed thru said gear train, a direct drive connecting means for connecting said members to revolve in unison, a connecting means and control means operating member always urged in one direction by the torque reaction of one of the gears, centrifugal weights on the driving member operable outwardly to move said operating member in the other direction, a resilient means opposing outward movement of said weights, a spring actuated means normally pressing said direct drive connecting means into connected relation by reacting against said operating member in a direction to restrain said weights from moving outwardly but transferable by outward movement of said weights to press said gear drive control means into applied relation by reacting against the operating member in a direction to oppose the resilient means moving said weights from the outward position.

12. Power transmission mechanism comprising, a driving member, a driven member, a planet pinion carrier on the driving member, planet pinions on said carrier, a ring gear on the driven member in mesh with said planet pinions, a sun gear in mesh with said planet pinions, a direct drive clutch for securing said sun gear to said carrier to rotate therewith, a gear drive brake for holding said sun gear against rotation, a speed responsive means on the driving member and operable by increased speed to disengage said direct drive clutch and engage said gear drive brake, and means operative by torque reaction on one of the gears to hold said speed responsive means from operating.

13. Power transmission mechanism comprising, a driving member, a driven member, a planet pinion carrier on the driving member, planet pinions on said carrier, a ring gear on said driven member in mesh with said planet pinions, a sun gear in mesh with said planet pinions, a direct drive clutch for securing said sun gear to said carrier to rotate therewith, a gear drive brake for holding said sun gear against rotation, centrifugal weights rotatable by the driving member and operable outwardly to disengage the direct drive clutch and engage the gear drive brake, and means operable by torque reaction of one of the gears to force said weights back to their inward position after they have moved outwardly thereby to disengage the gear drive brake and reengage the direct drive clutch.

14. Power transmission mechanism comprising, a driving member, a driven member, a planet pinion carrier on the driving member, planet pinions on said carrier, a ring gear on said driven member in mesh with said planet pinions, a sun gear in mesh with said planet pinions, a direct drive clutch member on the carrier, a non-rotatable gear drive brake member, a combined clutch and brake member mounted on the sun gear engageable with either the direct drive clutch member or the gear drive brake member, centrifugal weights rotatable by the driving member and operable outwardly to engage the combined clutch and brake member with the gear drive brake member, and torque responsive means carried by the sun gear operative to hold said weights from moving out and to return said weights after they have moved out.

15. Power transmission mechanism comprising, a driving member, a driven member, a planet pinion carrier on the driving member, planet pinions on said carrier, a ring gear on said driven member in mesh with said planet pinions, a sun gear in mesh with said planet pinions, a direct drive clutch member on the carrier, a non-rotatable gear drive brake member, a combined clutch and brake member mounted on the sun gear engageable with either the direct drive clutch member or the gear drive brake members, spring pressure means on the combined clutch and brake member normally operative to engage the combined clutch and brake member with the direct drive clutch member but operable to engage the combined clutch and brake member with the gear drive brake member, centrifugal weights on the driving member operable outwardly to cause the spring pressure means to take its pressure from the direct drive clutch member and apply it to the gear drive brake member, and resilient means to return said weights, said spring pressure means being operative to oppose outward movement of the weights when they are in and to oppose said resilient weight returning means when the weights are out.

16. The structure defined in claim 15 wherein the spring pressure means comprises a series of clutch engaging plungers and an equal number of counter weights rotatable about an axis, linkage connecting said plungers to said counterweights whereby when one moves outwardly the other moves inwardly, a series of springs urging the said plungers and weights in radially opposite directions to provide clutch engaging pressure, a plunger and a counterweight being one heavier than the other, and the heavier one normally closer to the axis of rotation than the lighter whereby the centrifugal force is balanced, but when the plungers and counterweights move to compress the springs the heavier one farther from the axis, whereby the excess centrifugal force thus generated will substantially compensate for the increase in tension in the springs due to their compressed state, whereby the clutch and brake engaging pressure of the plungers will be substantially no greater when the springs are compressed than when they are expanded.

17. The structure defined in claim 15 wherein the combined clutch and brake member is operable axially in one or the other direction to engage either the clutch or the brake member and wherein there are radially operable clutch and brake engaging plungers carried by the combined clutch and brake member, said plungers having opposite beveled faces at the ends, and wherein the centrifugal weights have associated therewith an axially operated clutch shifting member having opposite beveled faces corresponding to the beveled faces on the plungers, resilient means to press the beveled faces of the plungers against corresponding beveled faces on the shifting member, said shifting member being normally positioned so that one of the beveled faces of the plunger will slide down its corresponding beveled face of the shifting member and thereby move the combined clutch and brake member axially in one direction to engage the clutch members, but being movable axially by the centrifugal weights to a position where the other beveled face of the plunger will slide down its corresponding beveled face of the shifting member and thereby move the combined clutch and brake member axially in the other direction to engage the brake member.

18. The structure defined in claim 15 wherein there is a shiftable member, and the centrifugal weight is adapted for shifting said member by operation from an "in" position near the axis to an "out" position farther from the axis, and linkage connecting said weight and the said resilient weight returning means whereby outward movement of said weight compresses said resilient weight returning means, the ratio between the distance of the weights from the axis of rotation when in the "in" position to the distance when in the "out" position and the linkage being such that as the weight moves outwardly it gains in centrifugal force faster than the said resilient means gains in resistance.

FREDERICK W. COTTERMAN.